(12) United States Patent
Cox et al.

(10) Patent No.: US 7,221,536 B2
(45) Date of Patent: May 22, 2007

(54) COMBINED MEDIA LIBRARY CELL ARRAY AND STORAGE DEVICE UTILIZING A MEDIA HOLDER ADAPTED TO RECEIVE A COVER FOR CLOSING THE HOLDER

(75) Inventors: Aaron R. Cox, Tucson, AZ (US); Krista E. Nunn, Tucson, AZ (US); Robin D. Roberts, Tucson, AZ (US); Joni E. Saylor, Tempe, AZ (US)

(73) Assignee: International Business Machines Corporation, Armonk, NY (US)

( * ) Notice: Subject to any disclaimer, the term of this patent is extended or adjusted under 35 U.S.C. 154(b) by 429 days.

(21) Appl. No.: 10/845,740

(22) Filed: May 13, 2004

(65) Prior Publication Data

US 2005/0254164 A1    Nov. 17, 2005

(51) Int. Cl.
*G11B 15/68*  (2006.01)
(52) U.S. Cl. .................. 360/92; 369/30.39
(58) Field of Classification Search .......... 360/92; 369/30.39
See application file for complete search history.

(56) References Cited

U.S. PATENT DOCUMENTS

| | | | |
|---|---|---|---|
| 5,153,862 A | 10/1992 | Taylor et al. | 369/36 |
| 5,345,350 A | 9/1994 | Ellis et al. | 360/92 |
| 5,498,116 A | 3/1996 | Woodruff et al. | 414/331 |
| 5,646,918 A | 7/1997 | Dimitri et al. | 369/34 |
| 5,703,843 A | 12/1997 | Katsuyama et al. | 369/34 |
| 5,715,216 A | 2/1998 | Dang et al. | 369/34 |
| 5,761,161 A | 6/1998 | Gallo et al. | 369/36 |
| 5,808,828 A * | 9/1998 | Forrer et al. | 360/92 |
| 5,999,356 A | 12/1999 | Dimitri et al. | 360/71 |
| 6,041,026 A | 3/2000 | Hammar et al. | 369/36 |
| 6,243,332 B1 | 6/2001 | Dimitri et al. | 369/34 |
| 6,433,954 B1 * | 8/2002 | Rinard et al. | 360/92 |
| 7,119,982 B2 * | 10/2006 | Starr et al. | 360/92 |
| 2001/0044877 A1 | 11/2001 | Kanazawa et al. | 711/111 |

OTHER PUBLICATIONS

P.R. Bareman, P.Y. Hu, C.T. Johnson and A. J. Radman, "Cartridge Library System", Research Disclosure, Jun. 1984, No. 242, Kenneth Mason Publications Ltd., England, 1 page.

* cited by examiner

*Primary Examiner*—A. J. Heinz
(74) *Attorney, Agent, or Firm*—Harrington & Smith, PC

(57) ABSTRACT

A combined media holder and storage device including an outer frame section and an inner media support section. The outer frame section is adapted to be removably mounted to a media library. The media library includes a drive to read and write information on media, a mover to move the media to and from the drive, and a plurality of magazine receiving areas. The outer frame section is adapted to be removably inserted into one of the magazine receiving areas. The inner media support section includes a plurality of media receiving areas adapted to receive and separately individually support a plurality of pieces of recording media. The combined media holder and storage device has a substantially open front end and is closed except at the substantially open front end. The outer frame section is adapted to receive a cover for closing the substantially open front end.

15 Claims, 4 Drawing Sheets

COMBINED MEDIA LIBRARY CELL ARRAY AND STORAGE DEVICE UTILIZING A MEDIA HOLDER ADAPTED TO RECEIVE A COVER FOR CLOSING THE HOLDER

BACKGROUND OF THE INVENTION

1. Field of the Invention

The present invention relates to storing data and, more particularly, to a system for holding, storing and transporting library media.

2. Brief Description of Prior Developments

U.S. Pat. No. 5,999,356 discloses a data cartridge library with rotating storage stacks. Bulk carriers can be removably mounted in the rotatable stacks. Qualstar sells a TLS-8222 tape library which allows swapping out of LTO cartridges with a stack of cartridges held by a tape magazine. The Qualstar tape magazine does not comprise a snap on lid that adequately secures the tapes into the tape magazine. A user must use caution when using the magazine such that the tapes do not fall out. The Qualstar tape magazine does not efficiently stack with other tape magazines, and is not designed to be used to store tape cartridges for long periods of time. The Qualstar tape magazine is not designed to be used to ship tape cartridges. The Qualstar tape magazine does not provide long-term protection against contaminants. The Qualstar tape magazine does not encourage a user to store the media in a desired vertical position.

There exists a problem in that the there is a lack of a mechanism for housing pieces of media used in a library, such as a tape cartridge library, in a single container for either storage and/or transport. There is no existing way to move more than one piece of media at a time between a storage location and a use location in a library. Currently, if a user wishes to store and/or transport several pieces of media, the user must do so with a loose stack of individually packaged pieces of media in their individual protective jewel cases. There is a desire to provide a container for multiple pieces of storage media, such as tape cartridges, which will serve as an array of cells in a library and, after a protective cap is placed onto the container, covering the pieces of media inside. There is a desire to transport and store pieces of media without the use of individual jewel cases. There is a desire to decrease time to transport multiple pieces of storage media. There is a desire to decrease exposure to mishandling and damage to media during transport and/or storage. There is a desire to protect media for transport and storage as a group; rather than individually. There is a desire for a storage system which can orientate pieces of media in a desired storage orientation for longevity of the stored data in the media.

SUMMARY OF THE INVENTION

In accordance with one aspect of the present invention, a combined media holder and storage device is provided including an outer frame section and an inner media support section. The outer frame section is adapted to be removably mounted to a media library. The media library includes a drive to read and write information on media, a mover to move the media to and from the drive, and a plurality of magazine receiving areas. The outer frame section is adapted to be removably inserted into one of the magazine receiving areas. The inner media support section includes a plurality of media receiving areas adapted to receive and separately individually support a plurality of pieces of recording media. The combined media holder and storage device has a substantially open front end and is closed except at the substantially open front end. The outer frame section is adapted to receive a cover for closing the substantially open front end.

In accordance with another aspect of the present invention, a combined library tape cartridge holder and tape cartridge transport and storage device is provided comprising a frame and a cover. The frame has an inner tape cartridge support area adapted to separately support a plurality of individual tape cartridges. The tape cartridge support area is substantially closed except for a substantially open front end. The frame is adapted to be inserted into a library receiving area of a read/write tape library with the substantially open front end extending in an outward direction. The cover is removably connected to the frame to close the substantially open front end. The frame, with the cover removed, is adapted to hold the plurality of individual tape cartridges for separate removal and insertion by a mover of the read/write tape library. The cover can be attached to the frame for transport and storage of the individual tape cartridges without locating the tape cartridges in separate jewel cases.

In accordance with one method of the present invention, a method of holding and storing tape cartridges is provided comprising loading the tape cartridges into a combined library tape cartridge holder and tape cartridge transport and storage device, the device comprising a frame having an inner tape cartridge support area adapted to support a plurality of the tape cartridges, wherein the tape cartridge support area is substantially closed except for a substantially open front end; inserting the combined library tape cartridge holder and tape cartridge transport and storage device into a magazine receiving area of a read/write tape library such that a mover of the tape library can remove and insert the tape cartridges with the inner tape cartridge support area through the front end; removing the combined library tape cartridge holder and tape cartridge transport and storage device from the media receiving area with the tape cartridges in the inner tape cartridge support area; and connecting a cover to the device to close the substantially open front end to allow the tape cartridges to be transported and stored without removing the tape cartridges from the device.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
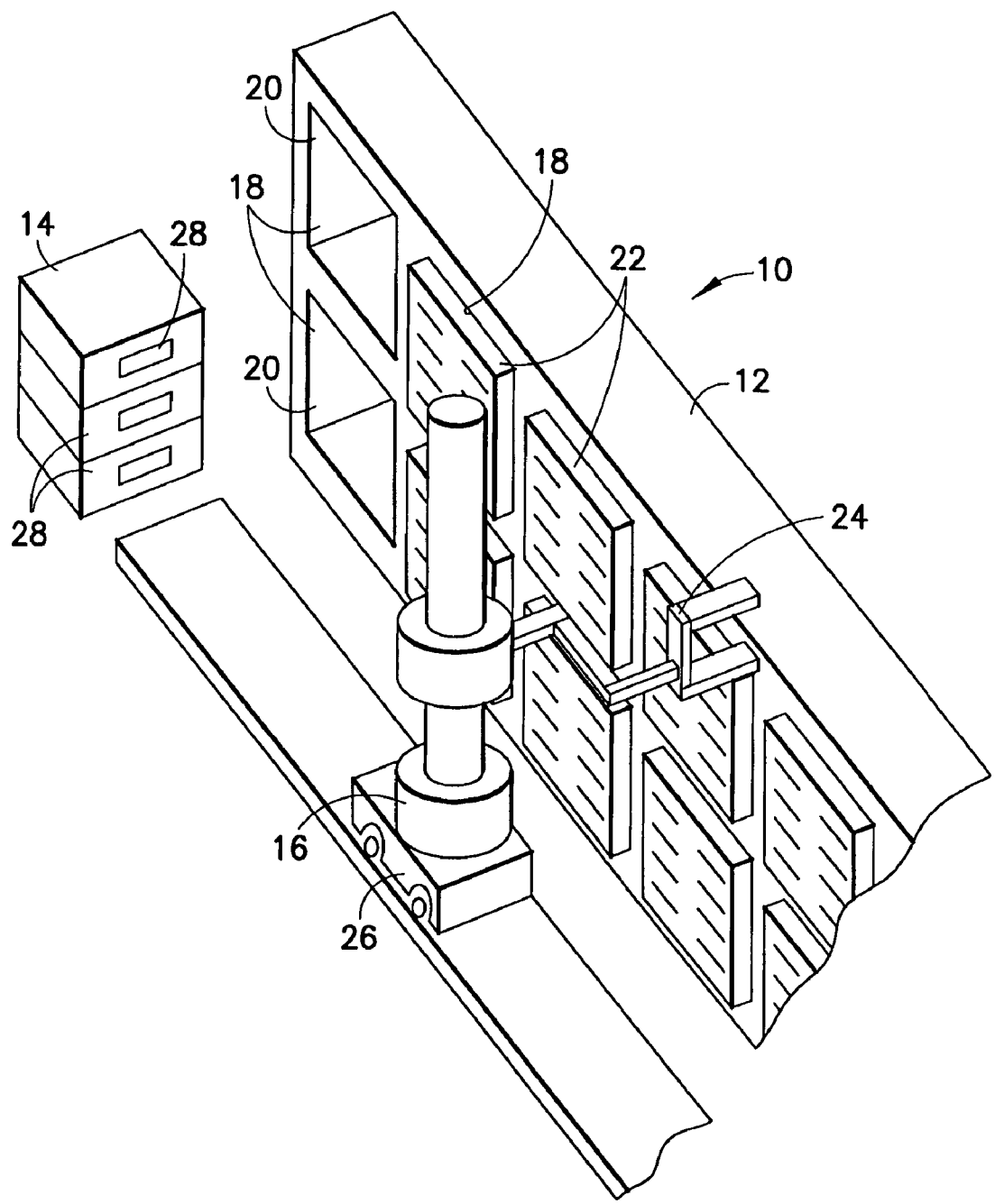
FIG. 1 is a partial perspective view of a media library incorporating features of the present invention.

Referring to FIG. 1, there is shown a partial perspective view of a media library 10 incorporating features of the present invention. Although the present invention will be described with reference to the exemplary embodiment shown in the drawings, it should be understood that the present invention can be embodied in many alternate forms of embodiments. In addition, any suitable size, shape or type of elements or materials could be used.

The library 10 generally comprises a media bookcase 12, a media read/write drive 14, and a media mover 16. The library 10 preferably comprises a frame with a movable door (not shown) to allow the area which the mover 16 moves to be closed. The media bookcase 12 is preferably formed from a portion of the library frame. The bookcase 12 comprises a plurality of magazine receiving areas 18. The magazine receiving areas 18 are substantially closed except for a substantially open front end 20. Each magazine receiving area 18 is adapted to removably receive a combined library tape cartridge holder and tape cartridge transport and storage device or cartridge magazine 22. As further described below, the devices 22 are each adapted to hold a plurality of recording media 30 (see FIG. 2), such as a tape cartridge. In alternate embodiments, any suitable type of library media bookcase or equivalent structure could be provided so long as the structure is adapted to removably receive one or more of the devices 22.

The media mover 16 is adapted to transport individual tape cartridges 30 between the media bookcase 12 and the read/write drive 14. The media mover 16 comprises a robotic arm 24 and a base drive unit 26 for accomplishing this task. In alternate embodiments, any suitable type of media mover could be provided. The read/write drive 14 preferably comprises a plurality of media read/write devices 28. Each read/write device 28 is adapted to read and write data on the recording media 30. In alternate embodiments, any suitable type of a read and/or write drives could be provided.

Figure 2:
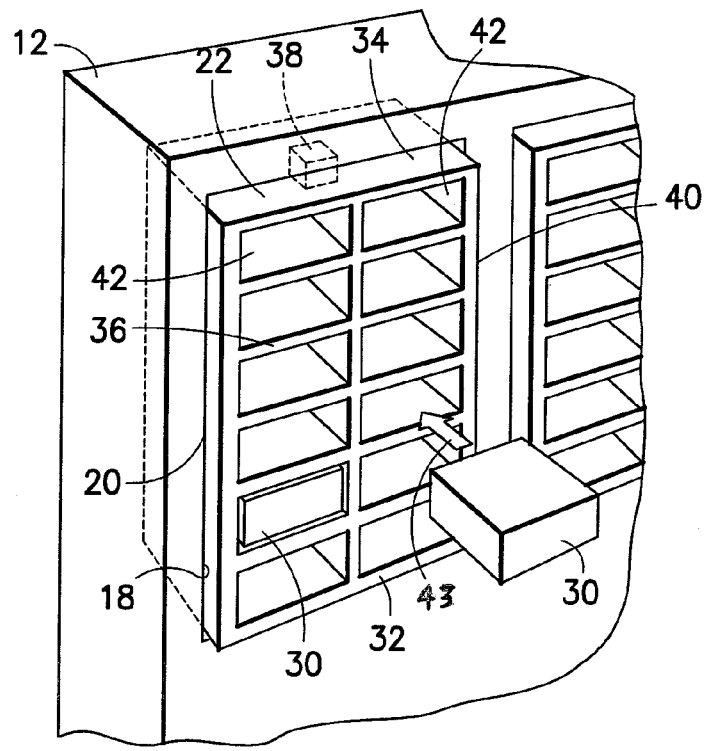
FIG. 2 is an enlarged partial perspective view of one of the magazines of the present invention shown inside a media bookcase of the media library shown in FIG. 1.

Referring also to FIG. 2, an enlarged view of one of the devices 22 is shown mounted to the media bookcase 12. The device 22 generally comprises a frame 32. The frame 32 comprises an outer frame section 34 and an inner media support section 36. The outer frame section 34 is sized and shaped to be removably inserted into one of the magazine receiving areas 18. Specifically, the outer frame section 34 is adapted to be inserted through the open front end 20 and stationarily supported inside the media bookcase 12. A latching system 38 could be provided to stationarily latch the outer frame section 34 with the media bookcase 12. Positioning of the outer frame section 34 into the magazine receiving area 18 provides a removable connection of the device 22 with the media bookcase 12. The outer frame section 32 is substantially closed except at a substantially open front end 40. The inner section 36 is accessible through the substantially open front end 40. In a preferred embodiment, the frame 32 is comprised of molded plastic or polymer material. In this preferred embodiment the inner media support section 36 can be integrally formed with the outer frame section 34 as a one-piece member. However, in alternate embodiments, the inner media support section 36 could be a separate component which is attached to the outer frame section 34. In addition, any suitable material(s) could be used.

The device 22 is located inside the magazine receiving area 18 such that the substantially open front end 40 of the outer frame section 34 faces outward from the media receiving area. In the embodiment shown, the inner media support section 36 forms a plurality of media receiving areas 42. Each media receiving area 42 is adapted to receive a single piece of media 30. In the embodiment shown, the media pieces comprise tape cartridges. The tape cartridges 30 can be inserted into the individual receiving areas 42 by the media mover 16 as indicated by arrow 43. Thus, the media receiving areas 42 form an array of cells for the media mover 16 to pick and place from. The tape cartridges 30 can be individually removed from the receiving areas 42 by the media mover 16 in a direction reverse to arrow 43. In the embodiment shown, the device 22 comprises two side-by-side columns of the media receiving areas 42. However, in alternate embodiments, any suitable type of media receiving area array could be provided. FIG. 2 shows the device 22 as being capable of holding twelve of the tape cartridges 30. However, in alternate embodiments, the device could be adapted to hold more or less than the twelve of the tape cartridges.

Figure 3:
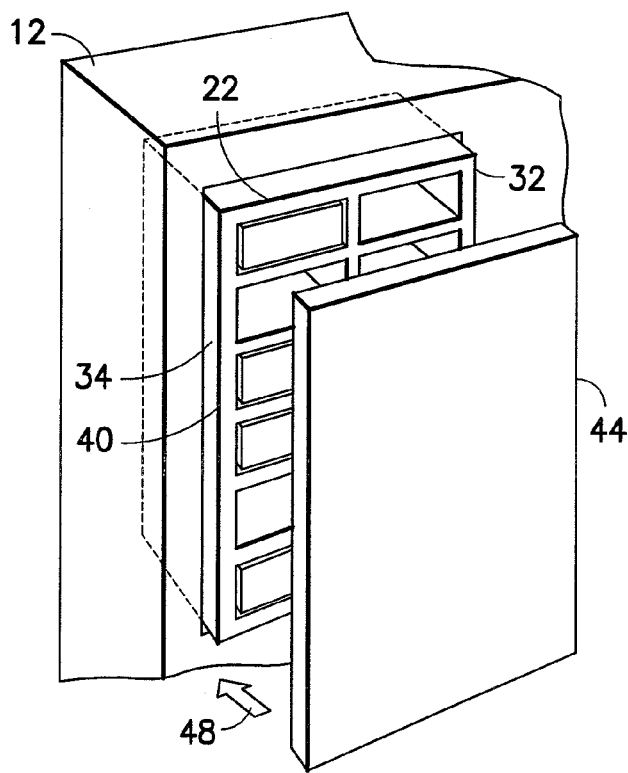
FIG. 3 is an enlarged partial perspective view as in FIG. 2 showing connection of the cover to the frame of the magazine.
Figure 4:
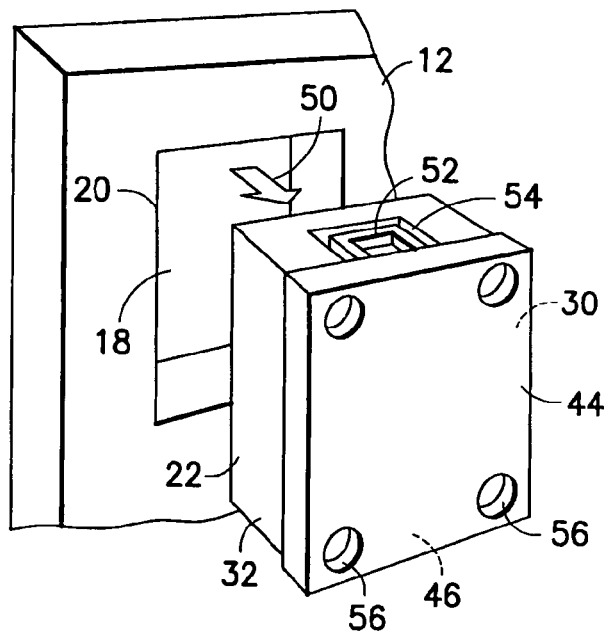
FIG. 4 is a partial perspective view as in FIG. 3 showing removal of the magazine from the media bookcase.

Referring also to FIGS. 3 and 4, at some point in time the user will desire to remove the device 22 from the library 10, along with the pieces of media 30 in the device 22, for storage and/or transport to another location. When this occurs, the user will temporarily disable the media mover 16, such as by an automatic system when a door to the library 10 is opened by the user. The device 22 further comprises a cover or lid 44. The cover 44 is sized and shaped to be attached to the front side of the frame 32 to close the substantially open front end 40. In a preferred embodiment, the cover 44 can be attached to the front end of the frame 32 while the frame 32 is still mounted inside the magazine receiving area 18 as indicated by arrow 48 in FIG. 3. In the embodiment shown, the cover 44 can be slid onto the front end 40 of the outer frame section 34, such as by a snap-on connection or an interference fit connection. In a preferred embodiment, the connection between the cover 44 and the frame 32 forms a seal at the connection. This sealed connection forms an enclosure 46 (see FIG. 4) inside the frame 32 and cover 44 which is sealed. However, in an alternate embodiment, the connection might not comprise a seal to form a sealed enclosure.

After the cover 44 is attached to the frame 32, the user can remove the device 22, comprising the frame 32 and attached cover 44, along with the media pieces 30 located inside the enclosure 46 as indicated by arrow 50. The device 22 can then be transported to a storage location and, if desired, also used to store the pieces of media 30 at the storage location without transferring the pieces of media 30 from inside the enclosure 46. The sealed enclosure 46 prevents contaminants from reaching the pieces of media 30 during transport and/or storage. In addition, because the pieces of media 30 did not need to be removed from the device 22, less time is spent transferring the pieces of media to the storage location. The pieces of media 32 not need to be removed from the device 22 and located inside another storage device, such as individual jewel cases.

As seen in FIG. 4, the device 22 also preferably comprises at least one handle 52. In a preferred embodiment, the device 22 comprises two of the handles 52; one handle 52 at two opposite sides of the frame 32. The handle 52 is adapted to collapsibly fold in a receiving area 54 on an exterior side of the outer frame section 34. However, In alternate embodiments, any suitable type of handle system could be provided. Alternatively, the device might not comprise a handle system. With the present invention, the handle 52 is adapted to collapse to allow location of the outer frame section 34 inside the magazine receiving area 18.

Figure 5:
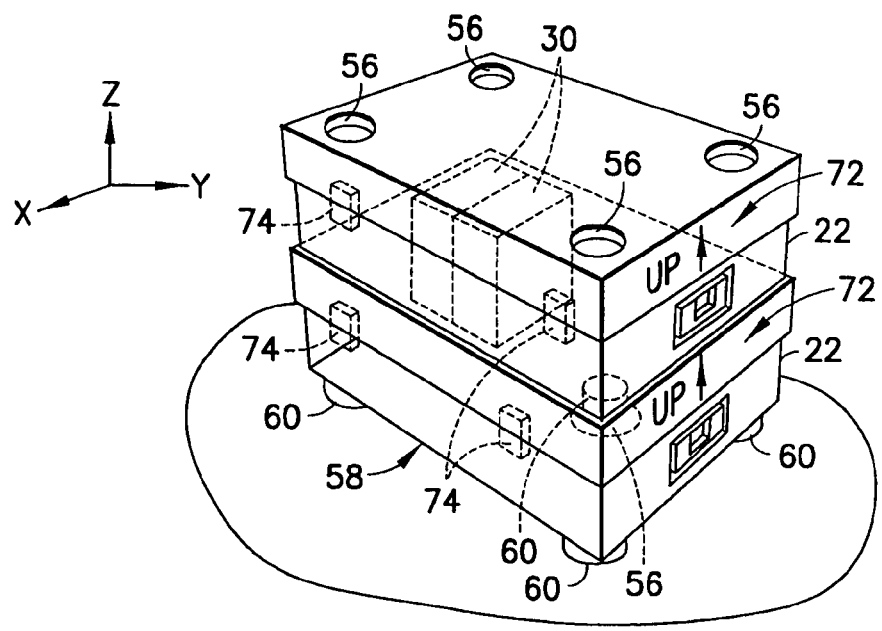
FIG. 5 is a perspective view showing two of the magazines stacked with each other.

In the embodiment shown, the cover 44 comprises recessed areas 56 on its exterior side. Referring also to FIG. 5, two of the devices 22 are shown stacked with each other. In a preferred embodiment, the rear side 58 of the frame 32 comprises feet 60. The feet 60 can be integrally formed with the frame 32. Preferably, the feet 60 comprise resilient members, such as rubber members, which are attached to the rear side 58 of the frame 32. The feet 60 are provided to allow the device 22 to be stabely located on a surface. In an alternate embodiment, the feet 60 might not be provided. In the embodiment shown, the recessed areas 56 on the cover 44 are sized and shaped to receive the feet 60 therein. Thus, as shown in FIG. 5, the devices 22 can be stacked with each other with the feet 60 of an upper device 22 located in the recessed areas 56 of the lower device 22. This provides an interlock between the stacked devices to help prevent relative movement in x and y directions. This provides a more stable stacking mechanism for the devices 22.

As seen in FIG. 5, the devices 22 are adapted to be located on a surface with the rear side 58 in a substantially horizontal position. While inside the magazine receiving area 18 of the library 10, the rear side 58 is adapted to be located in a substantially vertical position. Thus, the device 22 is adapted to be located in two different positions; a first position while located inside one of the magazine receiving areas 18 and a second position, about 90 degrees rotated from the first position, for locating the device 22 on a horizontal surface. While located on the horizontal surface as shown in FIG. 5 the pieces of media 30 can be located in a substantially vertical position. This substantially vertical position of the media provides for a better storage position, especially for a tape cartridge. Thus, the device 22 allows the media 30 to be located in a horizontal orientation as shown in FIG. 2 for easier pick and place movement by the media mover 16, and also allows the media to be located in a vertical orientation as shown in FIG. 5 for a better storage orientation of the media. The cover 44 also provides a protective cap for the media located inside the frame 32.

The device or magazine 22 preferably comprises indicia 72, such as "This End Up" and an arrow, for example, to indicate proper orientation of the device 22 during storage. The device 22 can also comprise security attachment points 74 on the frame 32 and cover 44 to attach a security tag to indicate tampering (i.e., unauthorized opening of the device 22) for more confident offsite storage.

Figure 6:
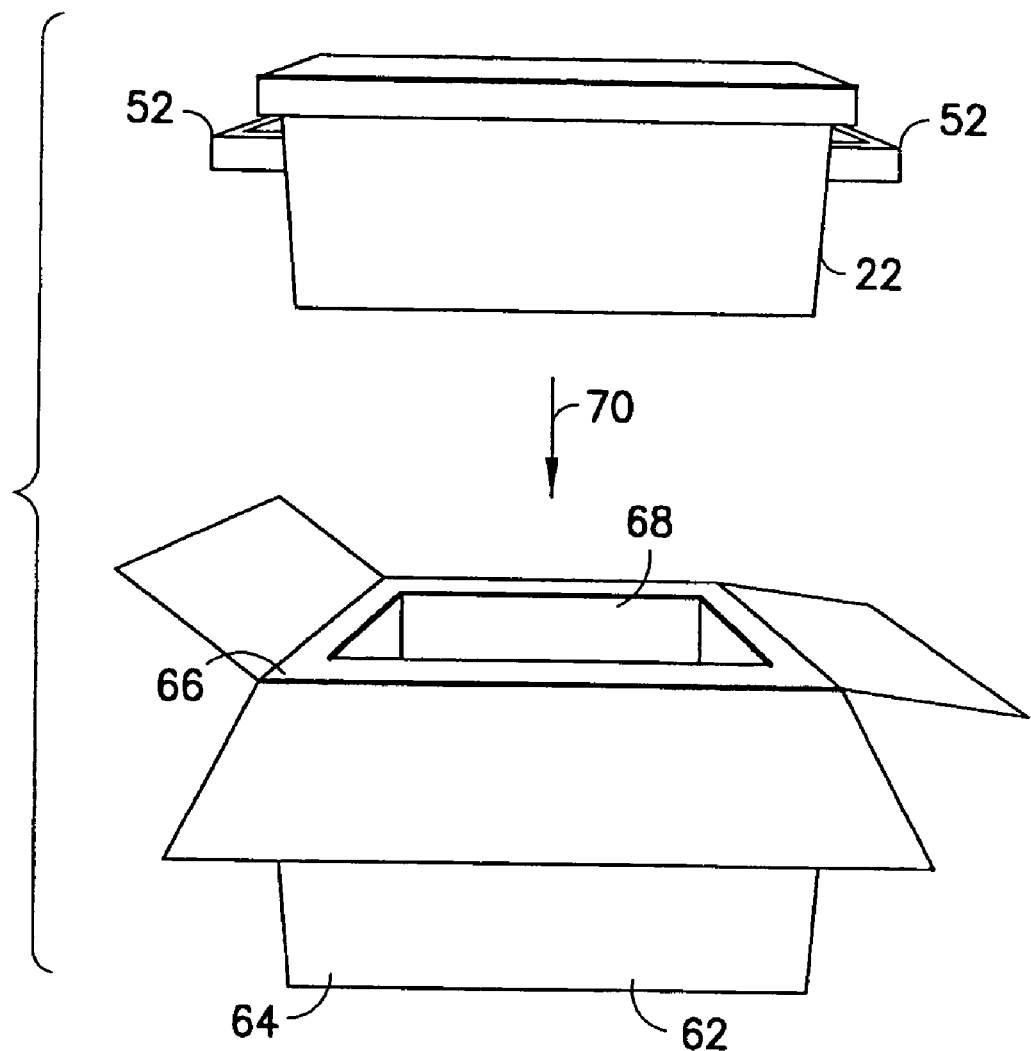
FIG. 6 is a perspective view showing one of the magazines being positioned into a carrier package for transport.

Referring also to FIG. 6, if it is desired to ship one or more of the devices 22 to a storage location, such as through the mail or by means of a carrier service, a carrier package 62 can be provided. The carrier package 62 preferably comprises a cardboard box 64 and a resilient packaging 66. The resilient packaging 66 could comprise a resilient foam ring or an equivalent structure comprising a receiving area 68 which is sized and shaped to receive the device 22 therein. The device 22 can be inserted into the receiving area 68 as indicated by arrow 70, preferably with the handles 52 in a collapsed position. The cardboard box 64 can then be closed and sealed for transport. Thus, the device 22 forms a simple package for insertion into resilient packaging in a carriage package which does not take much time to load and close. In an alternate embodiment, the carriage package could be adapted to receive more than one of the devices 22 in a stacked configuration. It should be noted, that the carriage package 62 does not need to be used to transport the device 22 to a storage location.

With the present invention, the problem solved concerns the lack of a mechanism for housing multiple pieces of media, such as a tape cartridge, used in a library in a single container for storage and/or transport. The present invention provides an ability to move more than one piece of media at a time to and from a library. A container for multiple pieces of storage media, such as tape cartridges, can serve as an array of cells in the library and, after a protective cap is placed onto the container, covers the pieces of media inside. The container can be removed from the library to remove the media as a group. This container can then serve as a system to transport and/or store the pieces of media without the use of individual jewel cases.

The present invention can decrease the time required to transport multiple pieces of storage media. The present invention can decrease exposure to mishandling and damage of the media. Cumbersome jewel cases for the media are no longer required. The storage media can be protected for transport and storage as a group, rather than individually. The pieces of media can be shipped as a group without jewel cases. The orientation of the pieces of media, such as tape cartridges, in the container can promote proper storage orientation (such as a vertical orientation) for longevity of the stored data. The present invention allows removing a group of storage media all at one time from the library which will decrease the time that the library needs to be offline with its door open.

The container can house several pieces of storage media in a single column or other configurations. This array of storage media, such as tape cartridges, may be installed in an automated library and the container can replace the cells for that set of storage media. When a user wishes to remove the group of storage media, the user can place the container's lid over the group of storage media, secure it, and remove the entire group from the library. This container eliminates the need to place the individual pieces of media in jewel cases for storage or transport. The container may have rubber feet and labeling to indicate proper, such as vertical, orientation for stacking and efficient storage. The container and cover can be air tight, and provide adequate protection from damaged better than a loose stack of jewel cases. The air tight container can be readily placed in a protective shipping container. The present invention can provide a snap-on lid that adequately secures the tapes into the magazine.

The present invention provides a lid (or other mechanism) for sealing out contaminants, such as dust, during storage outside of the library. The present invention provides a built-in mechanism (feet and "this end up" indicators) for insuring proper vertical orientation of the stored data cartridges outside of the library. The present invention provides a built-in system (feet nesting into a lid of another container) to allow secure stacking outside of the library. The present invention provides a resulting container and lid that are suitable for shipping data cartridges for off site storage, such as by use of a lid which snaps shut tight onto a container and has an attachment point(s) for a tamper-tag.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A media holder comprising:
   an outer frame section adapted to be removably mounted to a media library, wherein the media library comprises a media drive and a plurality of magazine receiving areas, wherein the outer frame section is adapted to be removably inserted into one of the magazine receiving areas; and
   an inner media support section connected to the outer frame section, the inner media support section comprising a plurality of media receiving areas adapted to receive and separately individually support a plurality of pieces of the recording media,
   wherein the media holder has a substantially open front end for insertion and removal of the pieces of recording media with the inner media support section, wherein the inner media support section is closed except at the substantially open front end, wherein the substantially open front end is adapted to face outward from the media receiving area when the media holder is mounted to the media library, and wherein the outer frame section is adapted to receive a cover for closing the substantially open front end,
   wherein the outer frame member is adapted to form an air tight sealed enclosure with the cover with the inner media support section inside the sealed enclosure when the cover is connected to the outer frame member.

2. The media holder as in claim 1 wherein the plurality of media receiving areas comprise at least two side-by-side columns of the media receiving areas.

3. The media holder as in claim 1 wherein the outer frame section comprises a general square or rectangular box shape.

4. The media holder as in claim 1 wherein the outer frame section is integrally formed with the inner media support section as a single one piece member.

5. The media holder as in claim 1 further comprising means for storing the media holder with the pieces of the recording media inside the media holder in a stacked configuration with at least one other media holder.

6. A media holder comprising:
   an outer frame section adapted to be removably mounted to a media library, wherein the media library comprises a media drive and a plurality of magazine receiving areas, wherein the outer frame section is adapted to be removably inserted into one of the magazine receiving areas; and
   an inner media support section connected to the outer frame section, the inner media support section comprising a plurality of media receiving areas adapted to receive and separately individually support a plurality of pieces of the recording media,
   wherein the media holder has a substantially open front end for insertion and removal of the pieces of recording media with the inner media support section, wherein the inner media support section is closed except at the substantially open front end, wherein the substantially open front end is adapted to face outward from the media receiving area when the media holder is mounted to the media library, wherein the outer frame section is adapted to receive a cover for closing the substantially open front end, and wherein the media holder further comprises projecting feet on an exterior side of the outer frame section at a closed rear end of the outer frame section.

7. The media holder as in claim 6 wherein the outer frame section is adapted to sit on a surface with the feet on the surface to orientate the recording media in a vertical position, wherein the inner media support section is adapted to hold the recording media in a horizontal orientation when the outer frame section is mounted to the media library.

8. A media holder comprising:
   an outer frame section adapted to be removably mounted to a media library, wherein the media library comprises a media drive and a plurality of magazine receiving areas, wherein the outer frame section is adapted to be removably inserted into one of the magazine receiving areas; and
   an inner media support section connected to the outer frame section, the inner media support section comprising a plurality of media receiving areas adapted to receive and separately individually support a plurality of pieces of the recording media,
   wherein the media holder has a substantially open front end for insertion and removal of the pieces of recording media with the inner media support section, wherein the inner media support section is closed except at the substantially open front end, wherein the substantially open front end is adapted to face outward from the media receiving area when the media holder is mounted to the media library, and wherein the outer frame section is adapted to receive a cover for closing the substantially open front end, further comprising the cover connected to the outer frame section, wherein the cover comprises recesses on an exterior side which are adapted to receive feet on an exterior side of the outer frame section.

9. A media holder comprising:
   an outer frame section adapted to be removably mounted to a media library, wherein the media library comprises a media drive and a plurality of magazine receiving areas, wherein the outer frame section is adapted to be removably inserted into one of the magazine receiving areas; and
   an inner media support section connected to the outer frame section, the inner media support section comprising a plurality of media receiving areas adapted to receive and separately individually support a plurality of pieces of the recording media,
   wherein the media holder has a substantially open front end for insertion and removal of the pieces of recording media with the inner media support section, wherein the inner media support section is closed except at the substantially open front end, wherein the substantially open front end is adapted to face outward from the media receiving area when the media holder is mounted to the media library, and wherein the outer frame section is adapted to receive a cover for closing the substantially open front end, and
   at least one collapsible folding handle connected to an exterior side of the outer frame section.

10. A library tape cartridge holder comprising:
    a frame having an inner tape cartridge support area adapted to separately support a plurality of individual tape cartridges, the tape cartridge support area being substantially closed except for a substantially open front end, wherein the frame is adapted to be inserted into a library receiving area of a read/write tape library with the substantially open front end extending in an outward direction; and
    a cover removably connected to the frame to close the substantially open front end,
    wherein the frame, with the cover removed, is adapted to hold the plurality of individual tape cartridges for separate removal and insertion by a mover of the read/write tape library, and wherein the cover can be attached to the frame for transport and storage of the individual tape cartridges as a group without locating the tape cartridges in separate jewel cases, wherein the library tape cartridge holder further comprises feet on an exterior side of the frame at a closed rear end of the frame and the cover comprises recesses on an exterior side which are adapted to receive the feet.

11. The library tape cartridge holder as in claim 10 further comprising:

means for storing the frame and cover with the tape cartridges inside the inner tape cartridge support area in a stacked configuration with at least one other library tape cartridge holder; and means for storing the tape cartridges inside the inner tape cartridge support area in a generally vertical orientation when the frame is in the stacked configuration; and means for holding the tape cartridges inside the inner tape cartridge support area in a generally horizontal orientation when the frame is inserted into the library receiving area of the read/write tape library.

12. The library tape cartridge holder as in claim 10 wherein the inner tape cartridge support area comprises a plurality of individual tape cartridge receiving areas comprising at least two side-by-side columns of the tape cartridge receiving areas.

13. The library tape cartridge holder as in claim 10 wherein the frame comprises an outer frame section comprised of a general square or rectangular box shape.

14. The library tape cartridge holder as in claim 10 wherein the frame and the cover form a sealed enclosure with the inner tape cartridge support area inside the sealed enclosure.

15. The library tape cartridge holder as in claim 10 wherein the frame is adapted to sit on a surface with the feet on the surface to orientate the individual tape cartridges in a vertical position, wherein the inner tape cartridge support area is adapted to hold the individual tape cartridges in a horizontal orientation when the frame is mounted in the library receiving area.

* * * * *